May 2, 1944.   L. W. BENZ   2,347,729
WELL TOOL
Filed June 24, 1941

INVENTOR
LEWIS W. BENZ
BY
Hudson, Young, Shanley & Ginzer
ATTORNEY

Patented May 2, 1944

2,347,729

UNITED STATES PATENT OFFICE 2,347,729

WELL TOOL

Lewis W. Benz, Bartlesville, Okla., assignor to Phillips Petroleum Company, a corporation of Delaware Application June 24 1941, Serial No. 399,525

10 Claims. (Cl. 166—11)

This invention relates to well tools, including those used in carrying out cementing operations.

Present methods of repairing casing by "squeeze" cementing jobs call for a "bridging" of the hole, both above and below the portion of the casing to be repaired. There are several methods of bridging, all of which essentially consist of a plug below the casing break, usually consisting of a bridge formed from rocks, sand, or other materials, or a mechanical plug which is anchored in the casing at a desired point below the break. A cement retainer which allows passage of fluid in a downward direction only is set above the region of the casing to be repaired. This retainer is attached to a string of tubing which extends upwardly to the surface of the ground. The cement slurry is conveyed through the tubing into that portion of the well bore between the upper and lower restrictive means. After performing the "squeeze" job and repairing the break in the casing, it is necessary to drill up the cement retainer, the cement in the casing, and the bridging material directly below the cement, and to remove all of these materials from the well bore in order that oil production may be resumed.

By the practice of my invention, it is possible to cement breaks or perforations in oil well casing, to circulate to the surface of the ground any excess cement which is not needed to seal the casing break, to maintain a desired pressure on the cement which has been forced into the formation, and to remove my apparatus from the well bore by relieving the pressure of the fluid on the formation and the apparatus after the cement has set. With my apparatus removed from the well bore, the casing is open from the surface of the ground to the bottom of the hole. Thus, the drilling up of the cement retainer, cement, and bridging materials now used for squeeze cementing jobs is eliminated.

The primary object of my invention is to provide a well tool for use in carrying out cementing operations and the like.

Another object of my invention is to provide a tool for repairing breaks in an oil well casing.

A further object is to provide a tool for injecting a substance through an opening in the wall of a string of casing.

Another object is to provide an oil well cementing tool which may be readily removed from the well bore after the completion of a squeeze cementing operation.

Figure 1:
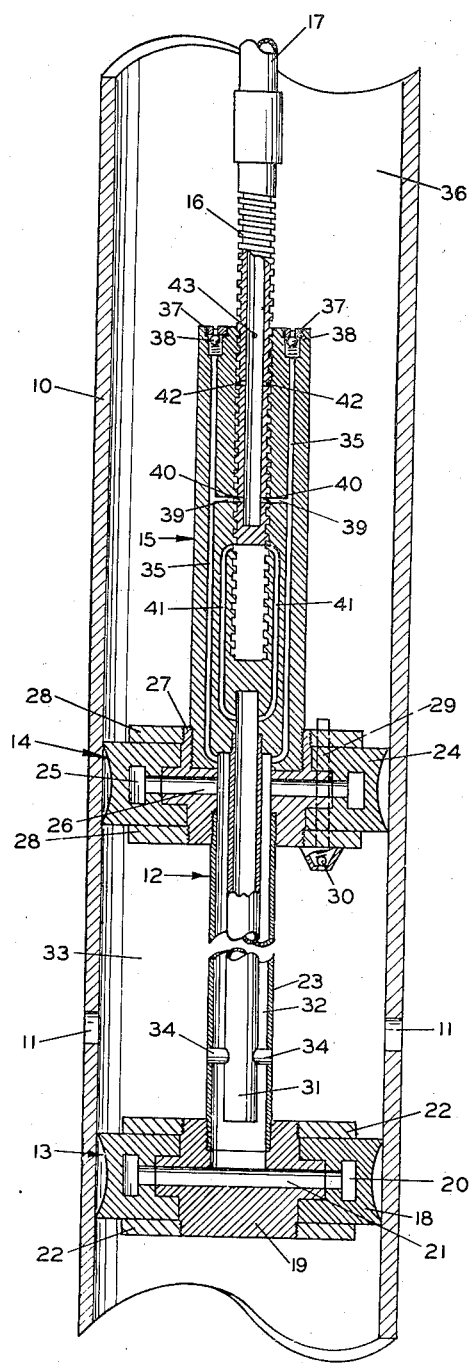
Figure 2:
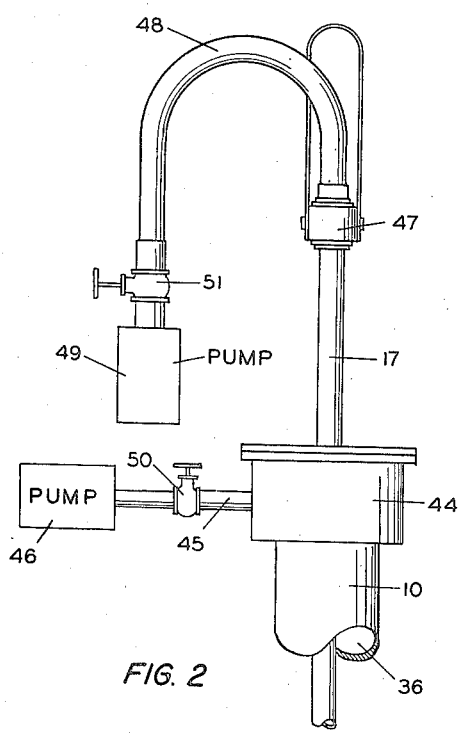

These and additional objects and advantages will be apparent to persons skilled in the art by reference to the following description and annexed drawing, wherein:

Figure 1 is an enlarged elevation view, partly in cross section, of my invention; and Figure 2 is a view in elevation of the surface equipment employed in practicing my invention.

Referring to Figure 1, I have shown a portion of an oil well casing 10 which is intermediate the surface of the ground and an oil-bearing formation, and having breaks or perforations 11. Within the casing at a point opposite the perforations is my improved cement retainer 12 which consists essentially of a bottom packing member 13, a top packer member 14, and an upper casting 15, which is internally threaded to receive an upper hollow externally threaded member 16, which in turn is secured to a string of tubing 17. Bottom packer member 13 has a packing element 18, which encircles a mandrel 19, and has an annular passage 20 which connects with a passage 21 in the mandrel. The packing element is preferably composed of a distortable resilient material, such as neoprene or duprene, and the periphery of the element is preferably designed so that expansion of the element against the internal surface of the casing allows a maximum area of contact therewith. Element 18 is secured to the mandrel by means of a pair of threaded rings 22, which are placed above and below the packing element, to prevent the leakage of fluid from within the packing member. The lower packer is threadedly attached to an outer tubular member 23 which in turn is threadedly connected to upper packing member 14. Upper packer 14 consists of a packing element 24 having an annular passage 25 which connects with a passage 26 of the upper mandrel 27, and a pair of threaded rings 28 which prevent leakage of fluid from the passage 26. In addition, the upper packer contains a vertical passage 29 which is sealed at the bottom by a spring-loaded check valve 30, when the pressure above packer 14 is greater than that below it. An inner tubular member 31, which is closed at its lower end, extends downwardly within tubular member 23 to the lower portion of that member. An annular passage 32, which communicates with passages 21 and 26, is formed between the exterior wall of tube 31 and the interior wall of member 23. A space 33 is formed in the casing between the upper and lower packers when the packing elements thereof are in contact with the casing. Conduits 34 provide communication between inner tube 31 and space 33.

It will be noted that upper casting 15 is threadedly connected to upper packing member 14 and contains fluid ducts 35, which establish communication between passage 32 and an annular space 36, which is formed in casing 10 above packing member 14. The upper end of casting 15 is adapted to receive externally threaded inserts 37, which contain spring-loaded check valves 38. Check valves 38, which are placed across passages 35, are adapted to close to maintain a pressure within packing members 13 and 14 when the fluid pressure within the packers is greater than the fluid pressure in annular space 36. Fluid ducts 35 also communicate with the interior of member 16 through branch ducts 39 and lower ports 40, which are provided in member 16. Casting 15 is further provided with cementing ducts 41 which communicate with tube 31. Member 16 also communicates with ducts 41 through lower ports 40, when the member is screwed downwardly in casting 15 a predetermined distance. Member 16 also has upper ports 42, which are placed above lower ports 40. Ports 42 establish communication between member 16 and ducts 35 when the member is screwed down a predetermined distance in casting 15. By providing two sets of ports, one above the other, in member 16, I am able to allow communication first between the member and ducts 35. By rotating the member a predetermined number of turns, the member communicates with ducts 41. Further rotation of the member again establishes communication between the member and ducts 35. A removable shear pin 43 is inserted through casting 15 and member 16 to prevent their becoming unscrewed upon lowering the device into casing 10. The threads of member 16 and casting 15 are preferably coated with a heavy lubricant to prevent leakage of fluid therefrom and to provide adequate lubrication.

Referring next ot Figure 2, it is noted that the upper end of the tubing passes through a common type of closure 44 which is secured to the casing and which allows both rotational and vertical movement of the tubing. A conduit 45, which is secured to the closure, establishes communication between a pump 46 and annular space 36. The upper end of the tubing is secured to a swivel 47, which suspends the tubing within the casing in a well known manner. The swivel allows the simutlaneous injection of fluid into the tubing and the rotation of the tubing and member 16. A flexible conduit 48, which is connected to the swivel and to a second pump 49, establishes communication between tubing 17 and pump 49. A pair of valves 50 and 51 are provided in conduits 45 and 48, respectively, to control the flow of fluid therethrough. These valves are preferably of a type which is adapted to readily restrict or "choke" the flow of fluid through the conduits, if it is desired.

In operation, let us assume that the apparatus is assembled, as shown in Figure 1, with ports 40 in member 16 opposite branch ducts 39 in casting 15 and with shear pin 43 inserted through member 16 and casting 15 to maintain these members in a predetermined position with respect to each other. The device is next lowered into the casing until perforations 11 lie between the upper and lower packing elements. In order to expand packing elements 18 and 24, water is urged by pump 49 through tubing 17, ports 40, branch ducts 39 and ducts 35, passage 32, and thence, to packers 13 and 14 where it fills radial passages 21 and 26 and annular passages 20 and 25, respectively, expanding the packing elements against the internal surface of the casing. Pumping may now be discontinued and valve 51 may be closed to maintain the packers in an expanded position. It will be noted that spring-loaded check valves 38 retain the water in the packing elements during this operation. Water is next pumped down annular space 36, utilizing pump 46, until pressure of the water in the annular space is greater than the pressure of the water within the tubing. Check valves 38 are now lifted from their seats and the packing members are further expanded in their respective positions by the pressure of the fluid in the annular space. Having set the packers, the tubing is rotated in order to shear pin 43 and to place ports 40 opposite cementing ducts 41. Thus, fluid in tubing 17 may enter cementing ducts 41 through ports 40. From the cementing ducts, the fluid flows through tube 31 and conduits 34 to space 33. Next, a neat cement slurry is pumped through the tubing, cementing ducts 41, tube 31, passages 34, and into space 33. Pressure is applied to the cement, forcing it into the formation through perforations 11. Care is taken during the operation to maintain the pressure within the passages of the packing members sufficiently above the pressure on the cement to insure the injection of the cement slurry into the formation. Having squeezed the desired amount of slurry into the formation, it its necessary to remove any excess cement from space 33. This is accomplished by decreasing the pressure of the fluid in annular space 36 to slightly below the pressure of the fluid in the tubing. By maintaining this pressure differential, which may be facilitated by "choking" valves 50 and 51, and slowly circulating water downwardly through the tubing, ducts 41, tube 31, conduits 34, thence upwardly through check valve 30, passage 29, and the annular space 36 to the surface of the ground, all cement within space 33 may be circulated out and replaced with clear water. The rate of circulation should be moderate so as to prevent erosion of cement slurry which lies in the perforations. Having circulated all of the excess cement slurry from between the packing members and out of the annular space, the system is shut in with a pressure maintained in the tubing, apparatus, and annular space 36. The apparatus is left under pressure until the cement slurry has set, whereupon, the pressure may be released from the tubing and the tubing further rotated until ports 42 are opposite branch ducts 39 of casting 15. This allows the pressure within packers 13 and 14 to be relieved, and the elements 18 and 24 to contract away from the internal surface of the casing, whereupon the cement retainer may be withdrawn from the casing.

From the foregoing, it is believed that the operation and advantages of the apparatus for practicing my instant invention will be readily comprehended by persons skilled in the art. It is to be clearly understood, however, that various changes in the apparatus shown and described may be resorted to without departing from the spirit of the invention, as defined by the appended claims.

I claim:

1. A well tool of the character described comprising a pair of spaced fluid expansible hollow packers, an outer tubular member disposed between the packers, an inner tubular member within the outer tubular member and spaced therefrom to form an annular passage that communicates with the interior of both packers, a conduit establishing communication between the interior of the inner tubular member and the exterior of the outer tubular member at a point intermediate the packers, and fluid conducting means coupled to one of the packers and including a member movable with respect to the packers, said means being adapted to transmit fluid material to the annular passage when the movable member is in one predetermined position with respect to the packers and to the inner tubular member when the movable member is in another predetermined position with respect to the packers.

2. A well tool of the character described comprising a pair of spaced fluid expansible hollow packers, an outer tubular member disposed between the packers, an inner tubular member within the outer tubular member and spaced therefrom to form an annular passage that communicates with the interior of both packers, a conduit establishing communication between the interior of the inner tubular member and the exterior of the outer tubular member at a point intermediate the packers, means connected to one of the packers, a first passage in said means communicating with the annular passage, a second passage in said means communicating with the inner tubular member and a hollow member coupled to and movable with respect to said means, said hollow member communicating with the first passage and closing the second passage when in one predetermined position with respect to said means and closing the first passage and communicating with the second passage when in another predetermined position with respect to said means.

3. A well tool of the character described comprising a pair of spaced fluid expansible hollow packers, an outer tubular member disposed between the packers, an inner tubular member within the outer tubular member and spaced therefrom to form an annular passage that communicates with the interior of both packers, a conduit establishing communicating between the interior of the inner tubular member and the exterior of the outer tubular member at a point intermediate the packers, means connected to one of the packers, a first passage in said means communicating with the annular passage, a second passage in said means communicating with the inner tubular member, a third passage in said means communicating with the exterior of said means and the annular passage, a check valve in the third passage to prevent the flow of fluid therethrough to the exterior of said means, and a hollow member coupled to and movable with respect to said means, said hollow member communicating with the first passage and closing the second passage when in one predetermined position with respect to said means and closing the first passage and communicating with the second passage when in another predetermined position with respect to said means.

4. A well tool of the character described comprising a pair of spaced fluid expansible hollow packers, an outer tubular member disposed between the packers, an inner tubular member within the outer tubular member and spaced therefrom to form an annular passage that communicates with the interior of both packers, a conduit establishing communicating between the interior of the inner tubular member and the exterior of the outer tubular member at a point intermediate the packers, and means coupled to one of the packers for transmitting fluid material to the annular passage and to the inner tubular member, said means including a device having an opening therein, a first passage in the device placing the opening in communication with the annular passage, a second passage in the device placing the opening in communication with the inner tubular member, a hollow member movable in the opening, a port in the hollow member extending from the interior to the exterior thereof, said port communicating with the first passage when the hollow member is in one predetermined position with respect to the device and communicating with the second passage when the hollow member is in another predetermined position with respect to the device.

5. A well tool of the character described comprising a pair of spaced fluid expansible hollow packers, an outer tubular member disposed between the packers, an inner tubular member within the outer tubular member and spaced therefrom to form an annular passage that communicates with the interior of both packers, a conduit establishing communication between the interior of the inner tubular member and the exterior of the outer tubular member at a point intermediate the packers, and means coupled to one of the packers for transmitting fluid material to the annular passage and to the inner tubular member, said means including a device having an opening therein, a first passage in the device placing the opening in communication with the annular passage, a second passage in the device placing the opening in communication with the inner tubular member, a third passage in the device communicating with the exterior thereof and the annular passage, a check valve in the third passage to prevent the flow of fluid therethrough to the exterior of the device, a hollow member movable in the opening in the the device, a port in the hollow member extending from the interior to the exterior thereof, said port communicating with the first passage when the hollow member is in one predetermined position with respect to the device and communicating with the second passage when the hollow member is in another predetermined position with respect to the device.

6. A well tool of the character described comprising a pair of spaced fluid expansible hollow packers adapted to be disposed one above the other in a well bore, a passageway through the upper packer for the flow of fluid from the space between the packers to the portion of the well bore above the upper packer, check valve means in the passageway for preventing the flow of fluid therethrough in a reverse direction, and means including a conduit adapted to communicate with the exterior of the well bore for selectively transmitting fluid material from the conduit into the interior of the packers and into the space between the packers.

7. A well tool of the character described comprising a pair of spaced fluid expansible hollow packers adapted to be disposed one above the other in a well bore, a passageway through the upper packer for the flow of fluid from the space between the packers to the portion of the well bore above the upper packer, check valve means in the passageway for preventing the flow of fluid therethrough in a reverse direction, a first conduit establishing communication between the packers, a second conduit communicating with the space between the packers, and means including a conduit adapted to communicate with the exterior of the well bore for selectively transmitting fluid material from the last mentioned conduit into the interior of the packers and into the space between the packers.

8. A well tool of the character described comprising a pair of spaced fluid expansible hollow packers adapted to be disposed one above the other in a well bore, an outer tubular member disposed between the packers, an inner tubular member within the outer tubular member and spaced therefrom to form an annular passage that communicates with the interior of both packers, a conduit establishing communication between the interior of the inner tubular member and the space between the packers, a passageway through the upper packer for the flow of fluid from the space between the packers to the portion of the well bore above the upper packer, check valve means in the passageway for preventing the flow of fluid therethrough in a reverse direction, and means coupled to the upper packer and including a conduit adapted to communicate with the exterior of the well bore for selectively transmitting fluid material from the last mentioned conduit to the annular passage and to the inner tubular member.

9. A well tool of the character described comprising a pair of spaced fluid expansible hollow packers adapted to be disposed one above the other in a well bore, an outer tubular member disposed between the packers, an inner tubular member within the outer tubular member and spaced therefrom to form an annular passage that communicates with the interior of both packers, a conduit establishing communication between the interior of the inner tubular member and the space between the packers, a passageway through the upper packer for the flow of fluid from the space between the packers to the portion of the well bore above the upper packer, a check valve in the passageway for preventing the flow of fluid therethrough in a reverse direction, means connected to one of the packers, a first passage in said means communicating with the annular passage, a second passage in said means communicating with the inner tubular member, and a hollow member coupled to and movable with respect to said means, said hollow member communicating with the first passage and closing the second passage when in one predetermined position with respect to said means and closing the first passage and communicating with the second passage when in another predetermined position with respect to said means.

10. A well tool of the character described comprising a pair of spaced fluid expansible hollow packers adapted to be disposed one above the other in a well bore, an outer tubular member disposed between the packers, an inner tubular member within the outer tubular member and spaced therefrom to form an annular passage that communicates with the interior of both packers, a conduit establishing communication between the interior of the inner tubular member and the space between the packers, a passageway through the upper packer for the flow of fluid from the space between the packers to the portion of the well bore above the upper packer, a check valve in the passageway for preventing the flow of fluid therethrough in a reverse direction, means connected to one of the packers, a first passage in said means communicating with the annular passage, a second passage in said means communicating with the inner tubular member, a third passage in said means communicating with the annular passage and the portion of the well bore above the packers, a check valve in the third passage to prevent the flow of fluid therethrough to the portion of the well bore above the packers, and a hollow member coupled to and movable with respect to said means, said hollow member communicating with the first passage and closing the second passage when in one predetermined position with respect to said means and closing the first passage and communicating with the second passage when in another predetermined position with respect to said means.

LEWIS W. BENZ.